(12) United States Patent
Mc Pherrin

(10) Patent No.: US 6,309,167 B1
(45) Date of Patent: Oct. 30, 2001

(54) TRASH CONTAINER TRAILER ASSEMBLY

(76) Inventor: Allen E. Mc Pherrin, 6160 E. Butte Rd., Live Oak, CA (US) 95953

( * ) Notice: Subject to any disclaimer, the term of this patent is extended or adjusted under 35 U.S.C. 154(b) by 0 days.

(21) Appl. No.: 09/663,129

(22) Filed: Sep. 15, 2000

(51) Int. Cl.[7] .................................. B60P 1/04; B60P 1/28; B62B 1/16
(52) U.S. Cl. ..................... 414/457; 414/480; 414/482
(58) Field of Search ................. 414/457, 480, 414/483, 482

(56) References Cited

U.S. PATENT DOCUMENTS

| D. 322,235 | 12/1991 | Bell . | |
|---|---|---|---|
| 2,081,504 | * 5/1937 | Quick | ................................... 414/457 |
| 3,598,420 | 8/1971 | Edlin . | |
| 3,620,397 | * 11/1971 | Gagnon | ................................. 414/482 |
| 4,042,138 | 8/1977 | Arvidsson . | |
| 4,362,309 | 12/1982 | Stamper . | |
| 4,566,708 | 1/1986 | Specie . | |
| 5,016,896 | * 5/1991 | Shafer | .............................. 414/483 X |
| 5,039,271 | 8/1991 | Julian . | |
| 5,441,378 | * 8/1995 | Puks | ..................................... 414/458 |

FOREIGN PATENT DOCUMENTS

735838 * 8/1955 (GB) .................................... 414/457

* cited by examiner

Primary Examiner—Steven A. Bratlie

(57) ABSTRACT

A trash container trailer assembly for facilitating transport of a trash container using a vehicle. The trash container trailer assembly includes a main frame assembly with a hitch portion adapted for coupling to a vehicle, a support frame assembly pivotally coupled to the main frame assembly, a locking assembly for selectively engaging the support frame assembly to the main frame assembly, and a plurality of wheels.

11 Claims, 4 Drawing Sheets

TRASH CONTAINER TRAILER ASSEMBLY

BACKGROUND OF THE INVENTION

1. Field of the Invention

The present invention relates to trailers and more particularly pertains to a new trash container trailer assembly for facilitating transport of a trash container using a vehicle.

2. Description of the Prior Art

The use of trailers is known in the prior art. More specifically, trailers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,039,271; U.S. Pat. No. 4,042,138; U.S. Pat. No. 4,566,708; U.S. Pat. No. 3,598,420; U.S. Pat. No. 4,362,309; and U.S. Pat. No. Des. 322,235.

While these devices fulfill their respective, particular objectives and requirements, the aforementioned patents do not disclose a new trash container trailer assembly. The inventive device includes a main frame assembly with a hitch portion adapted for coupling to a vehicle, a support frame assembly pivotally coupled to the main frame assembly, a locking assembly for selectively engaging the support frame assembly to the main frame assembly, and a plurality of wheels.

In these respects, the trash container trailer assembly according to the present invention substantially departs from the conventional concepts and designs of the prior art, and in so doing provides an apparatus primarily developed for the purpose of facilitating transport of a trash container using a vehicle.

SUMMARY OF THE INVENTION

In view of the foregoing disadvantages inherent in the known types of trailers now present in the prior art, the present invention provides a new trash container trailer assembly construction wherein the same can be utilized for facilitating transport of a trash container using a vehicle.

The general purpose of the present invention, which will be described subsequently in greater detail, is to provide a new trash container trailer assembly apparatus and method which has many of the advantages of the trailers mentioned heretofore and many novel features that result in a new trash container trailer assembly which is not anticipated, rendered obvious, suggested, or even implied by any of the prior art trailers, either alone or in any combination thereof.

To attain this, the present invention generally comprises a main frame assembly with a hitch portion adapted for coupling to a vehicle, a support frame assembly pivotally coupled to the main frame assembly, a locking assembly for selectively engaging the support frame assembly to the main frame assembly, and a plurality of wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new trash container trailer assembly apparatus and method which has many of the advantages of the trailers mentioned heretofore and many novel features that result in a new trash container trailer assembly which is not anticipated, rendered obvious, suggested, or even implied by any of the prior art trailers, either alone or in any combination thereof.

It is another object of the present invention to provide a new trash container trailer assembly which may be easily and efficiently manufactured and marketed.

It is a further object of the present invention to provide a new trash container trailer assembly which is of a durable and reliable construction.

An even further object of the present invention is to provide a new trash container trailer assembly which is susceptible of a low cost of manufacture with regard to both materials and labor, and which accordingly is then susceptible of low prices of sale to the consuming public, thereby making such trash container trailer assembly economically available to the buying public.

Still yet another object of the present invention is to provide a new trash container trailer assembly which provides in the apparatuses and methods of the prior art some of the advantages thereof, while simultaneously overcoming some of the disadvantages normally associated therewith.

Still another object of the present invention is to provide a new trash container trailer assembly for facilitating transport of a trash container using a vehicle.

Yet another object of the present invention is to provide a new trash container trailer assembly which includes a main frame assembly with a hitch portion adapted for coupling to a vehicle, a support frame assembly pivotally coupled to the main frame assembly, a locking assembly for selectively engaging the support frame assembly to the main frame assembly, and a plurality of wheels.

Still yet another object of the present invention is to provide a new trash container trailer assembly that has a built in tie-down system for the trash container.

Even still another object of the present invention is to provide a new trash container trailer assembly that reduces lifting and the probability of injury during the transport of trash containers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
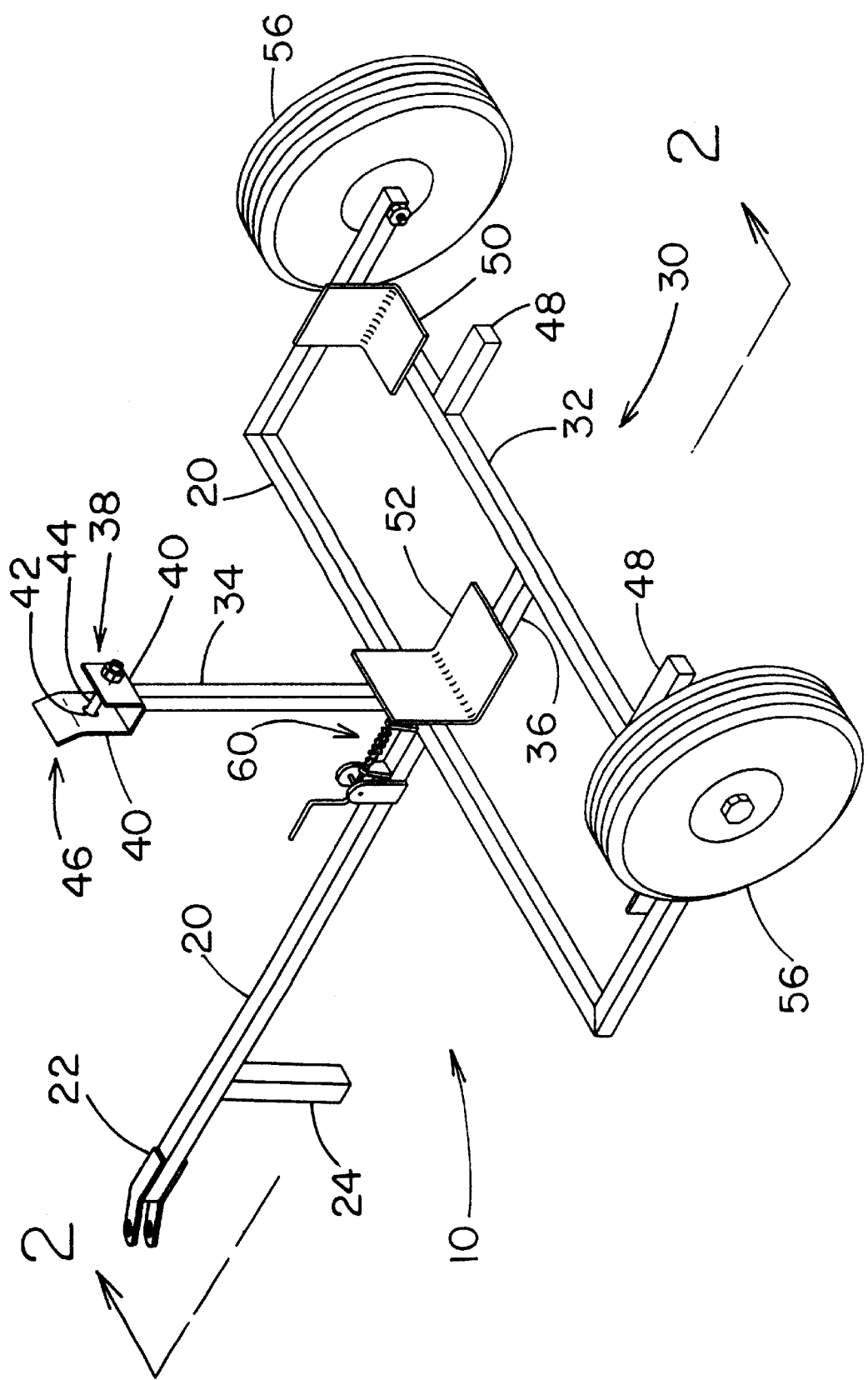
FIG. 1 is a schematic perspective view of a new trash container trailer assembly according to the present invention.
Figure 2:
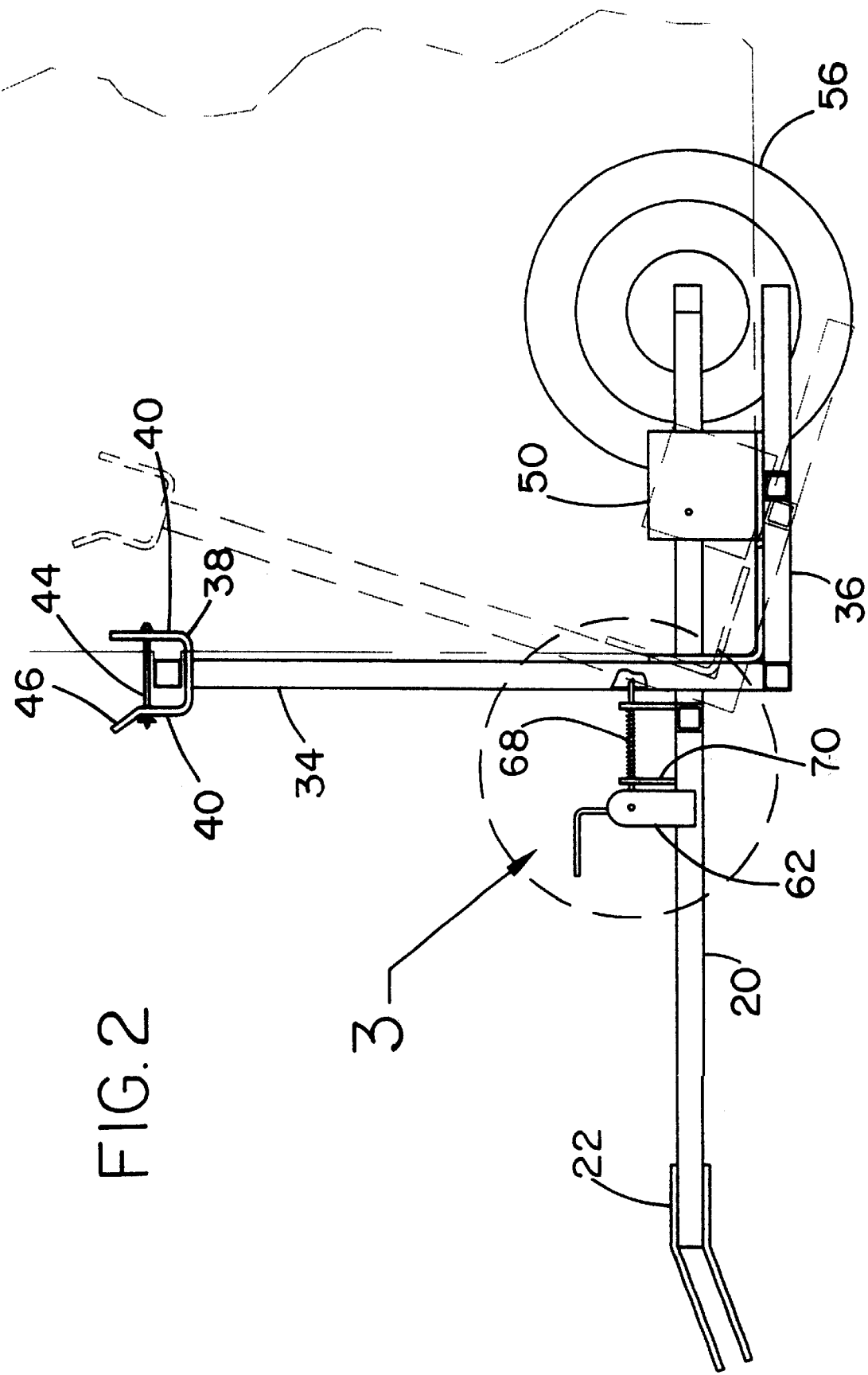
FIG. 2 is a schematic cross-section view of the present invention taken along line 2—2 of FIG. 1.
Figure 3:
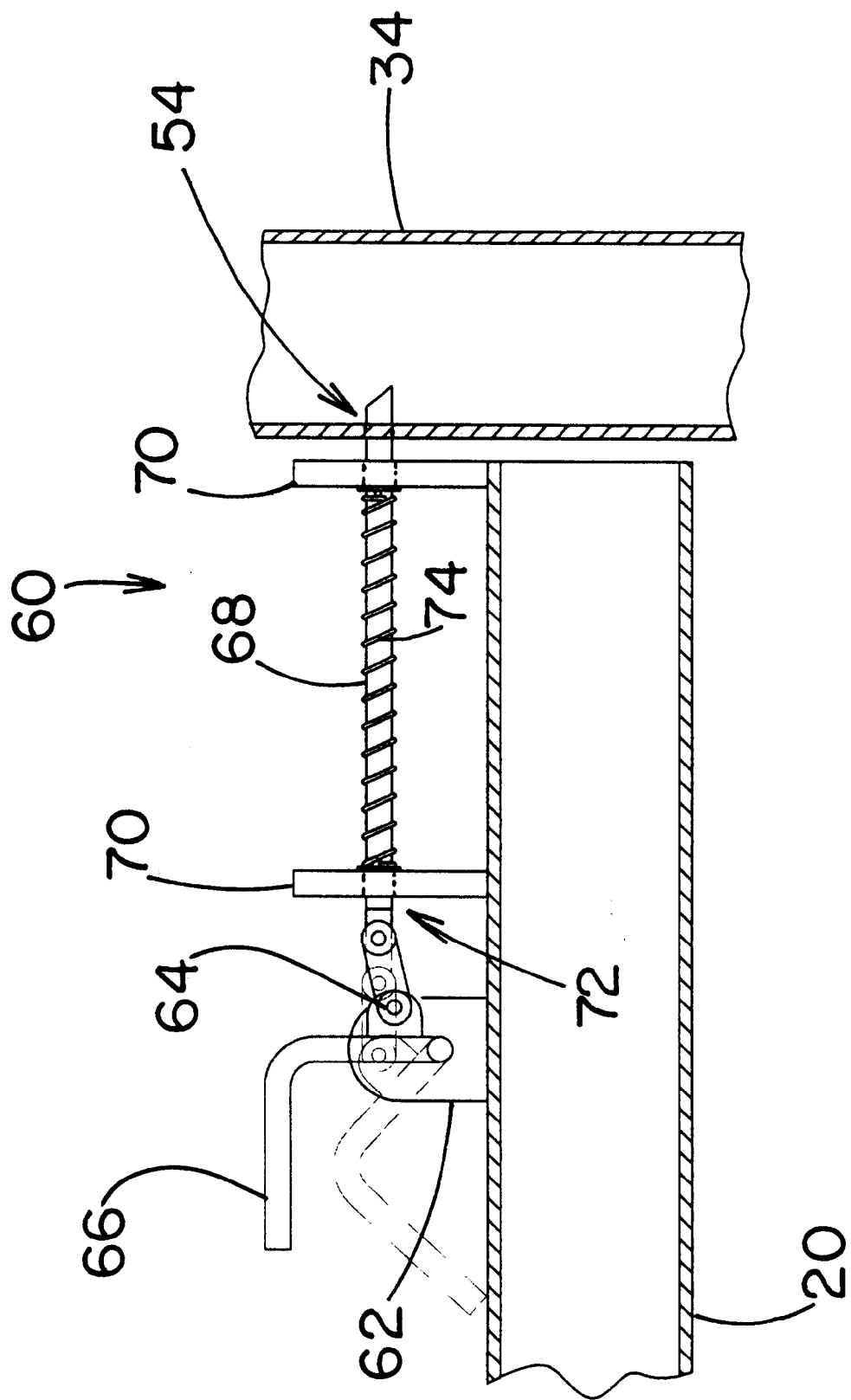
FIG. 3 is a schematic detail view of the locking assembly of the present invention.
Figure 4:
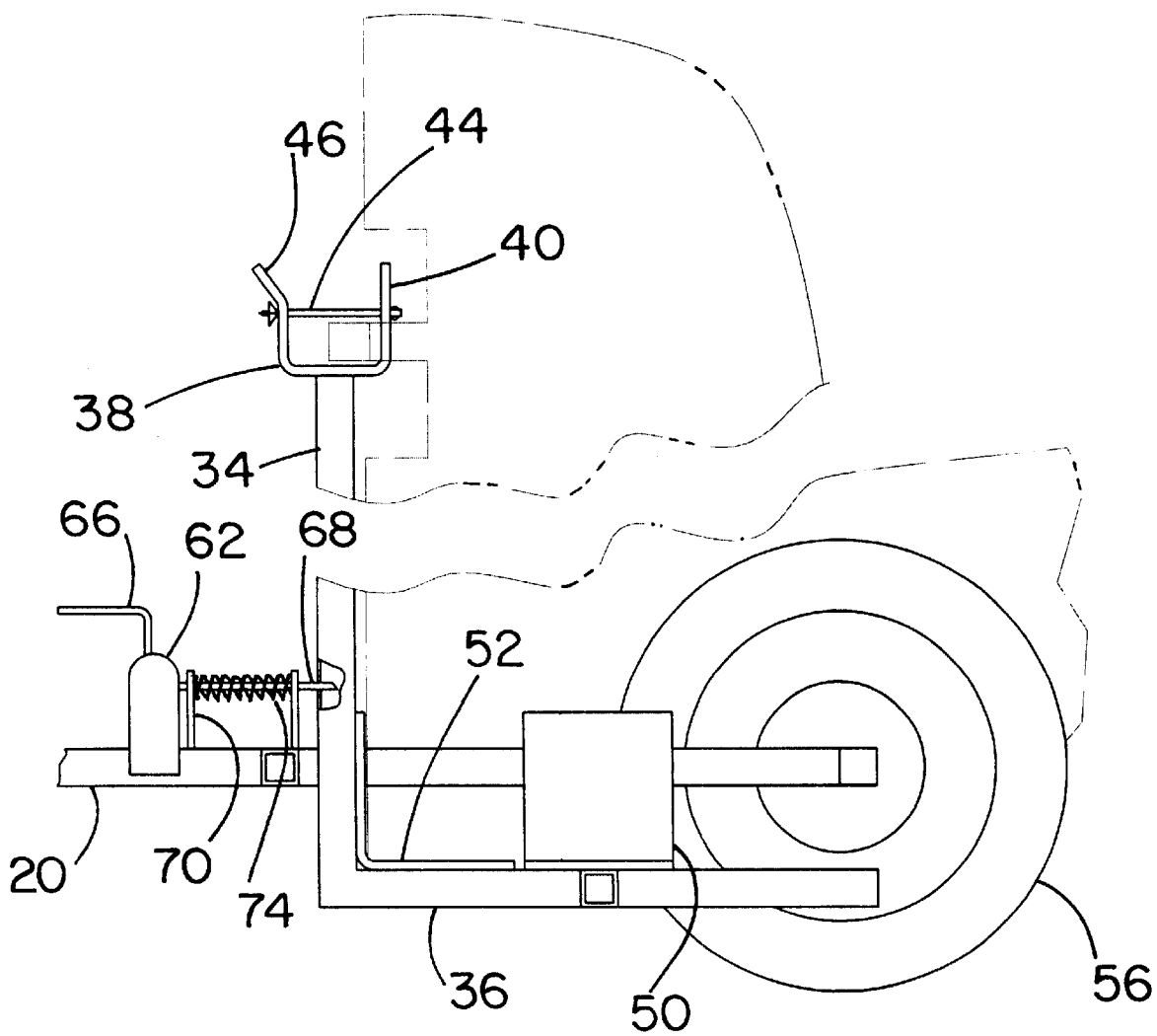
FIG. 4 is a schematic side view of the present invention.

With reference now to the drawings, and in particular to FIGS. 1 through 4 thereof, a new trash container trailer assembly embodying the principles and concepts of the present invention and generally designated by the reference numeral 10 will be described.

As best illustrated in FIGS. 1 through 4, the trash container trailer assembly 10 generally comprises a main frame assembly 20, a support frame assembly 30, a locking assembly 60, and a plurality of wheels 56.

The main frame assembly 20 includes a hitch portion 22 designed for coupling to a vehicle.

The support frame assembly 30 is coupled to the main frame assembly 20. The support frame assembly 30 is designed for supporting a trash container for transporting the trash container using the vehicle. The support frame assembly 30 is pivotable relative to the main frame assembly 20 for facilitating coupling of the trash container to the support frame assembly 30.

The locking assembly 60 is coupled to the main frame assembly 20. The locking assembly 60 is for selectively engaging the support frame assembly 30. Thus the support frame assembly 30 is held in a transport position defined by the support frame assembly 30 supporting the trash can above a ground surface to permit transport of the trash container.

The plurality of wheels 56 is coupled to the main frame assembly 20 for permitting rolling of the main frame assembly 20 while the main frame assembly 20 is coupled to the vehicle.

The main frame assembly 20 includes a support leg 24 coupled to the hitch portion 22 proximate a distal end of the hitch portion 22 for supporting the distal end of the hitch portion 22 when the hitch portion 22 is disconnected from the vehicle.

The support frame assembly 30 includes a cross beam member 32 and a generally L-shaped member which includes a first flange 34, which is positionable in a substantially upright position when the support frame assembly 30 is in the transport position. The L-shaped member includes a second flange 36 which extends between a base of the first flange 34 and a medial portion of the cross beam member 32.

A generally U-shaped bracket 38 is coupled to an upper end of the first flange 34. The U-shaped bracket 38 is designed for receiving a handle of the trash container when the trash container is positioned on the support frame assembly 30.

The U-shaped bracket 38 includes a pair of outer portions 40. The outer portions 40 are substantially vertically aligned when the support frame assembly 30 is in the transport position. Thus the U-shaped bracket 38 is designed for preventing the trash container from moving laterally when the handle of the trash container is received in the U-shaped bracket 38.

The U-shaped bracket 38 includes a pair of aligned holes 42. Each of the holes 42 is positioned in associated one of the outer portions 40.

A handle locking pin 44 is insertable through the holes 42 and couplable to the U-shaped bracket 38 when the U-shaped bracket 38 receives the handle of the trash container. Thus the handle is engaged to the U-shaped bracket 38 for securing the trash container to the support frame assembly 30.

A central support member 52 includes outer edges which extend outwardly from the L-shaped member. The central support member 52 includes a first planar portion, which extends along the first flange 34 and a second planar portion, which extends along the second flange 36.

Each of a pair of generally L-shaped side support members 50 includes a planar base portion coupled to an associated end of the cross beam member 32. Each side support member 50 further includes a planar lateral support portion extending orthogonally upwards from the base portion such that the side support members 50 are designed for preventing lateral movement of the trash container on the support frame assembly 30 when the trash container is positioned on the support frame assembly 30.

A pair of spaced support bars 48 extend from the cross beam member 32. Each of the support bars 48 includes a distal end designed for contacting a ground surface when the support frame assembly 30 is pivoted into a loading position.

The support frame assembly 30 includes a locking aperture 54. The locking assembly 60 includes a pair of spaced side walls 62, a pivot pin 64 extending between the side walls 62, a handle 66 with a first end pivotally coupled to the pivot pin 64, a locking pin 68 with a proximal end pivotally coupled to a medial portion of the handle 66. Thus pivoting the handle 66 selectively extends and retracts the locking pin 68 such that a distal end of the locking pin 68 is selectively insertable into and retractable from the locking aperture 54.

The locking assembly 60 further includes a pair of alignment members 70. The alignment members 70 are positioned in spaced relationship to each other on the main frame assembly 20. Each of the alignment members 70 includes an associated alignment hole 72.

The locking pin 68 passes through the alignment holes 72 of the alignment members 70. Thus the locking pin 68 is aligned with the locking aperture 54 when the support frame assembly 30 is in the transport position.

A biasing coil 74 is positioned between the alignment members 70. The locking pin 68 is inserted through the biasing coil 74. The biasing coil 74 includes a first end for abutting a first one of the alignment members 70. The first one of the alignment members 70 is positioned between the handle 66 and a second one of the alignment members 70. A second end of the biasing coil 74 is coupled to the locking pin 68. Thus the biasing coil 74 urges the locking pin 68 into an extended position.

A first one of the outer portions 40 of the U-shaped bracket 38 includes an outwardly bent distal portion 46 such that the first one of the outer portions 40 is designed for facilitating positioning of the handle of the trash container between the outer portions 40 of the U-shaped bracket 38.

In use, the hitch portion of the main frame assembly is coupled to a vehicle. The locking assembly handle is positioned such that the locking pin is disengaged from the locking aperture of the support frame. The support frame is then pivoted to the loading position, and a handle of a trash container is engaged by the U-shaped bracket. The handle locking pin is inserted through each of the aligned holes in the outer portions of the U-shaped bracket. The support frame is then pivoted to the transport position and the locking pin is re-engaged with the locking aperture of the support frame.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trash container trailer assembly comprising:

a main frame assembly having a hitch portion adapted for coupling to a vehicle;

a support frame assembly coupled to said main frame assembly, said support frame assembly being adapted for supporting a trash container for transporting the trash container using the vehicle;

said support frame assembly being pivotable relative to said main frame assembly for facilitating coupling of the trash container to said support frame assembly;

a locking assembly coupled to said main frame assembly, said locking assembly being for selectively engaging said support frame assembly whereby said support frame assembly is held in a transport position defined by said support frame assembly supporting the trash can above a ground surface to permit transport of the trash container;

said support frame assembly including a cross beam member, a generally L-shaped member having first flange positionable in a substantially upright position when said support frame assembly is in said transport position, said L-shaped member including a second flange extending between a base of said first flange and a medial portion of said cross beam member;

a generally U-shaped bracket coupled to an upper end of said first flange, said U-shaped bracket being adapted for receiving a handle of the trash container when the trash container is positioned on said support frame assembly;

said U-shaped bracket having a pair of outer portions, said outer portions being substantially vertically aligned when said support frame assembly is in said transport position whereby said U-shaped bracket is adapted for preventing the trash container from moving laterally when the handle of the trash container is received in said U-shaped bracket;

said U-shaped bracket including a pair of aligned holes, each of said holes being positioned in associated one of a plurality of outer portions; and a handle locking pin insertable through said holes and couplable to said U-shaped bracket when said U-shaped bracket receives the handle of the trash container whereby said handle locking pin is engaged to said U-shaped bracket for securing the handle of the trash container to said support frame assembly.

2. The trash container trailer assembly of claim 1, further comprising:

a plurality of wheels coupled to said main frame assembly for permitting rolling of said main frame assembly while said main frame assembly is coupled to the vehicle.

3. The trash container trailer assembly of claim 1, further comprising:

said main frame assembly including a support leg coupled to said hitch portion proximate a distal end of said hitch portion for supporting said distal end of said hitch portion when said hitch portion is disconnected from the vehicle.

4. The trash container trailer assembly of claim 1, further comprising:

a first one of said outer portions of said U-shaped bracket having an outwardly bent distal portion such that said first one of said outer portions is adapted for facilitating positioning of the handle of the trash container between said outer portions of said U-shaped bracket.

5. The trash container trailer assembly of claim 1, further comprising:

a central support member having outer edges extending outwardly from said L-shaped member, said central support member having a first planar portion extending along said first flange and a second planar portion extending along said second flange.

6. The trash container trailer assembly of claim 1, further comprising:

a pair of generally L-shaped side support members, each side support member having a planar base portion coupled to an associated end of said cross beam member, each side support member further having a planar lateral support portion extending orthogonally upwards from said base portion such that said side support members are adapted for preventing lateral movement of the trash container on the support frame assembly when the trash container is positioned on the support frame assembly.

7. The trash container assembly of claim 1, further comprising:

a pair of spaced support bars extending from said cross beam member, each of said support bars having a distal end adapted for contacting a ground surface when said support frame assembly is pivoted into a loading position.

8. The trash container trailer assembly of claim 1, further comprising:

said support frame assembly including a locking aperture;

said locking assembly including a pair of spaced side walls, a pivot pin extending between said side walls, a handle having a first end pivotally coupled to said pivot pin, a locking pin having a proximal end pivotally coupled to a medial portion of said handle whereby pivoting said handle selectively extends and retracts said locking pin such that a distal end of said locking pin is selectively insertable into and retractable from said locking aperture.

9. The trash container trailer assembly of claim 8, further comprising:

said locking assembly further including a pair of alignment members, said alignment members being positioned in spaced relationship to each other on said main frame assembly, each of said alignment members having an associated alignment hole;

said locking pin passing through said alignment holes of said alignment members whereby said locking pin is aligned with said locking aperture when said support frame assembly is in said transport position.

10. The trash container trailer assembly of claim 9, further comprising:

a biasing coil positioned between said alignment members, said locking pin being inserted through said biasing coil, said biasing coil having a first end for abutting a first one of said alignment members, said first one of said alignment members being positioned between said handle and a second one of said alignment members, a second end of said biasing coil being coupled to said locking pin whereby said biasing coil urges said locking pin into an extended position.

11. A trash container trailer assembly comprising:

a main frame assembly having a hitch portion adapted for coupling to a vehicle;

a support frame assembly coupled to said main frame assembly, said support frame assembly being adapted for supporting a trash container for transporting the trash container using the vehicle;

said support frame assembly being pivotable relative to said main frame assembly for facilitating coupling of the trash container to said support frame assembly;

a locking assembly coupled to said main frame assembly, said locking assembly being for selectively engaging said support frame assembly whereby said support frame assembly is held in a transport position defined by said support frame assembly supporting the trash can above a ground surface to permit transport of the trash container;

a plurality of wheels coupled to said main frame assembly for permitting rolling of said main frame assembly while said main frame assembly is coupled to the vehicle;

said main frame assembly including a support leg coupled to said hitch portion proximate a distal end of said hitch portion for supporting said distal end of said hitch portion when said hitch portion is disconnected from the vehicle;

said support frame assembly including a cross beam member, a generally L-shaped member having first flange positionable in a substantially upright position when said support frame assembly is in said transport position, said L-shaped member including a second flange extending between a base of said first flange and a medial portion of said cross beam member;

a generally U-shaped bracket coupled to an upper end of said first flange, said U-shaped bracket being adapted for receiving a handle of the trash container when the trash container is positioned on said support frame assembly;

said U-shaped bracket having a pair of outer portions, said outer portions being substantially vertically aligned when said support frame assembly is in said transport position whereby said U-shaped bracket is adapted for preventing the trash container from moving laterally when the handle of the trash container is received in said U-shaped bracket;

said U-shaped bracket including a pair of aligned holes, each of said holes being positioned in associated one of said outer portions;

a handle locking pin insertable through said holes and couplable to said U-shaped bracket when said U-shaped bracket receives the handle of the trash container whereby said handle locking pin is engaged to said U-shaped bracket for securing the handle the trash container to said support frame assembly;

a central support member having outer edges extending outwardly from said L-shaped member, said central support member having a first planar portion extending along said first flange and a second planar portion extending along said second flange;

a pair of generally L-shaped side support members, each side support member having a planar base portion coupled to an associated end of said cross beam member, each side support member further having a planar lateral support portion extending orthogonally upwards from said base portion such that said side support members are adapted for preventing lateral movement of the trash container on the support frame assembly when the trash container is positioned on the support frame assembly;

a pair of spaced support bars extending from said cross beam member, each of said support bars having a distal end adapted for contacting a ground surface when said support frame assembly is pivoted into a loading position;

said support frame assembly including a locking aperture;

said locking assembly including a pair of spaced side walls, a pivot pin extending between said side walls, a handle having a first end pivotally coupled to said pivot pin, a locking pin having a proximal end pivotally coupled to a medial portion of said handle whereby pivoting said handle selectively extends and retracts said locking pin such that a distal end of said locking pin is selectively insertable into and retractable from said locking aperture;

said locking assembly further including a pair of alignment members, said alignment members being positioned in spaced relationship to each other on said main frame assembly, each of said alignment members having an associated alignment hole;

said locking pin passing through said alignment holes of said alignment members whereby said locking pin is aligned with said locking aperture when said support frame assembly is in said transport position;

a biasing coil positioned between said alignment members, said locking pin being inserted through said biasing coil, said biasing coil having a first end for abutting a first one of said alignment members, said first one of said alignment members being positioned between said handle and a second one of said alignment members, a second end of said biasing coil being coupled to said locking pin whereby said biasing coil urges said locking pin into an extended position; and a first one of said outer portions of said U-shaped bracket having an outwardly bent distal portion such that said first one of said outer portion is adapted for facilitating positioning of the handle of the trash container between said outer portions of said U-shaped bracket.

* * * * *